March 7, 1961 T. D. EATER 2,973,954
PNEUMATIC SPRING
Filed March 12, 1958 2 Sheets-Sheet 1

INVENTOR.
THEODORE D. EATER
BY Francis T. Burgess
ATTORNEY

March 7, 1961  T. D. EATER  2,973,954
PNEUMATIC SPRING
Filed March 12, 1958  2 Sheets-Sheet 2
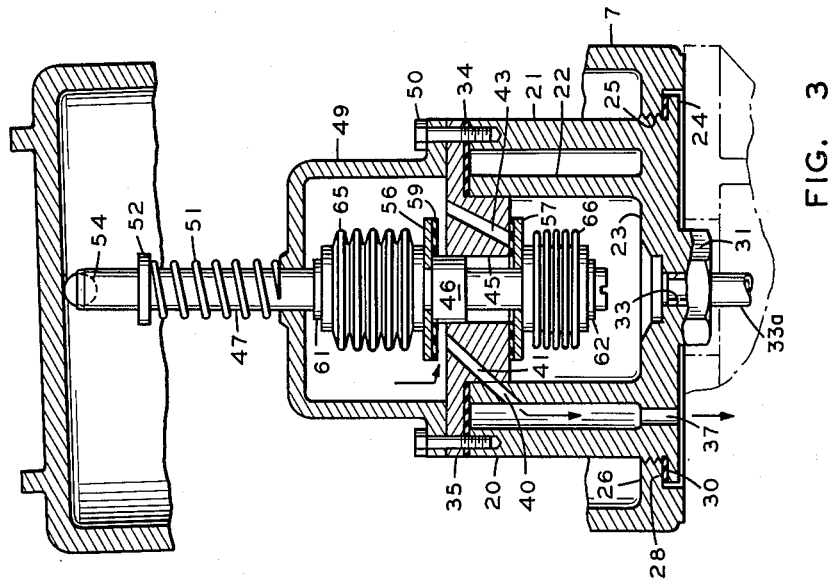
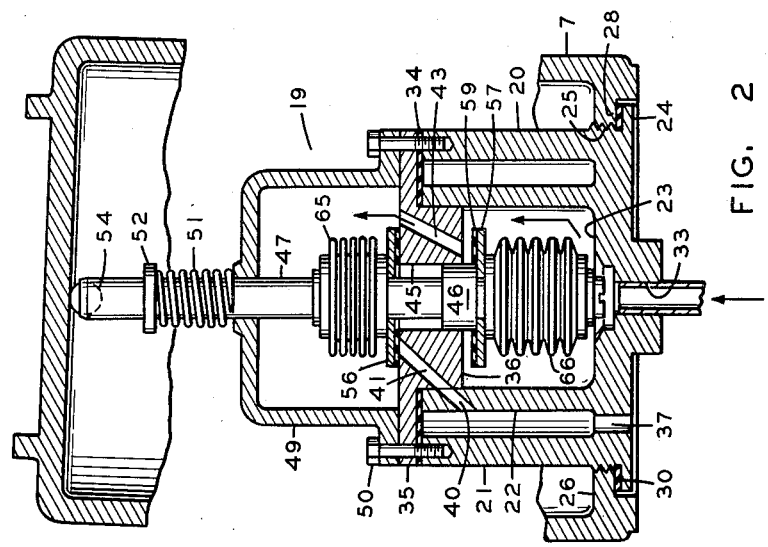
INVENTOR.
THEODORE D. EATER
BY
*Francis T. Burgess*
ATTORNEY

United States Patent Office 2,973,954
Patented Mar. 7, 1961

2,973,954
PNEUMATIC SPRING

Theodore D. Eater, Nashville, Ill., assignor to General Steel Castings Corporation, Granite City, Ill., a corporation of Delaware Filed Mar. 12, 1958, Ser. No. 720,985

18 Claims. (Cl. 267—65)

The invention relates to pneumatic springs for vehicles and consists particularly in a pneumatic spring having a self-contained level-regulating valve.

The use of valves for varying the pressure in pneumatic springs, responsive to changes in the applied load, so as to maintain the spring height substantially constant throughout the load range are well-known. Such valves are frequently of complex construction and must be connected to air lines leading to and from the spring. Because of the restricted space available on suspension devices such as railway trucks, the application of such valves creates a particular problem. To overcome this problem in the past, it has been suggested that the valve be located within the spring air chamber, but this in turn is disadvantageous in that maintenance of the valve requires dismantling of the spring: In the case of a flexible wall spring of the type generally employed, clamping rings securing the flexible wall structure to rigid wall structure must be removed, a time consuming operation involving the removal of a large number of bolts and breaking the seal between the flexible wall bellows and the rigid end portions of the spring structure.

Accordingly it is a principal object of the invention to provide a level regulating valve of a simpler and more rugged construction than any heretofore known.

It is a further object to provide a combination of spring and valve arrangement in which the valve can be bodily removed from and inserted in the spring without dismantling of the chamber.

It is a further object to provide, in a flexible wall pneumatic spring, an internal level regulating valve, the function of which is not adversely affected by transverse deflection of the springs.

The foregoing, as well as additional objects and advantages, will be more evident from this description, particularly when read in connection with the accompanying drawings, wherein:

Figure 2 is a fragmentary transverse sectional view of the same spring in a depressed position.

Figure 3 is a transverse vertical sectional view of the spring fully extended.

Figure 1:
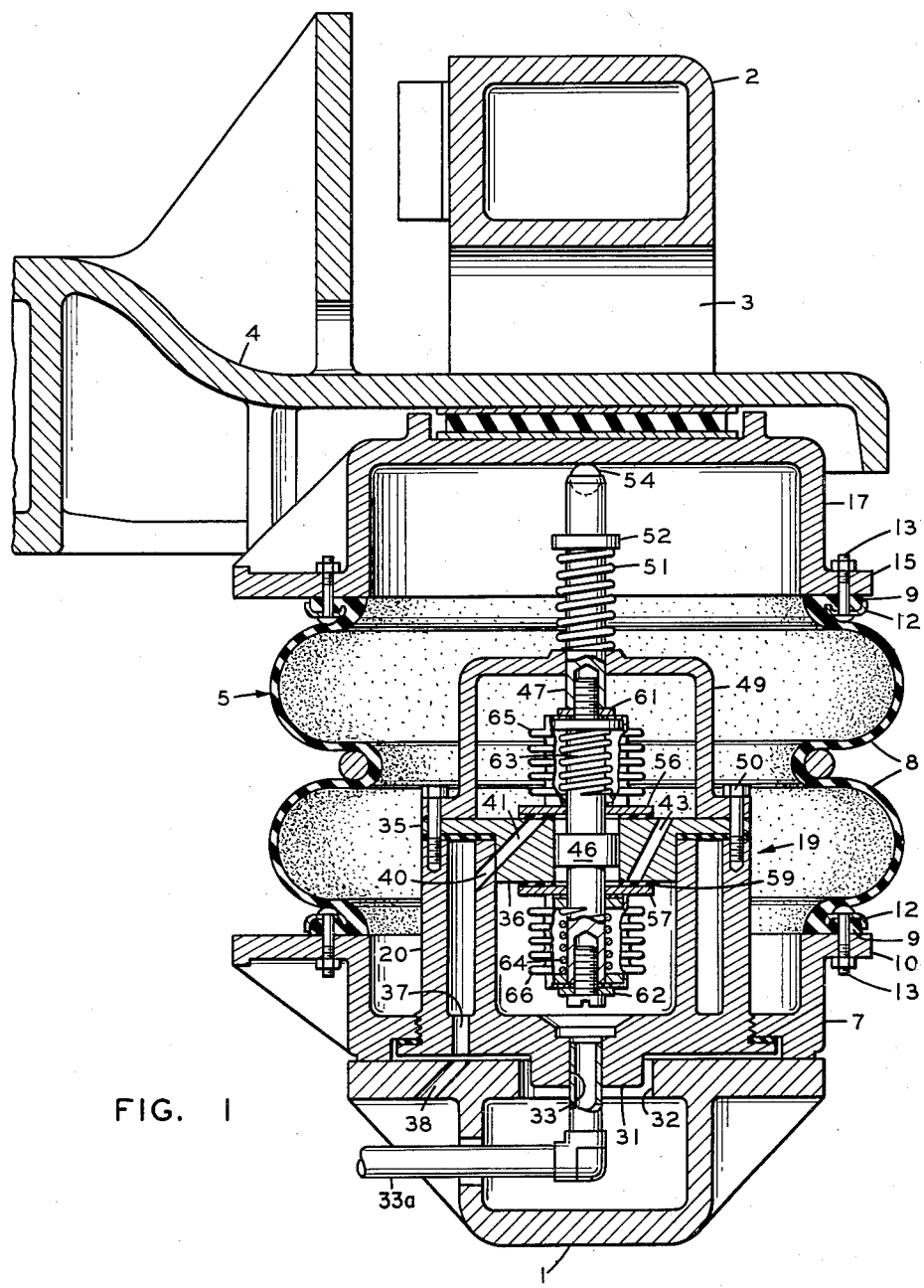
Figure 1 is a transverse vertical sectional view of a portion of a railway car truck equipped with a spring constructed in accordance with this invention.

Referring now more particularly to the drawings, Figure 1 shows a portion of a railway vehicle truck including the frame side member bottom chord 1, top chord 2, a column 3 connecting the top and bottom chords, and a bolster 4 supported on a pneumatic spring 5 seated on bottom chord 1.

Spring 5 consists of a lower cup 7, a two convolution rubber bellows 8, the terminal portions of which are formed with an annular bead 9 which is secured to a peripheral flange 10 on cup 7 by clamping ring 12 and associated bolts 13. The upper terminal portion of bellows 8 is similarly formed with an annular bead 9 which is similarly secured by means of a similar clamping ring 12 and bolts 13 to a peripheral flange 15 on upper inverted cup 17, on which the bolster 4 is seated.

For admitting air to the chamber formed by cup-like elements 7 and 17 and bellows 8, a height responsive valve device, generally indicated at 19 is provided. Valve device 19 includes a double walled cylindrical body member 20 having an outer wall 21, an inner wall 22 and a flat bottom wall 23. For facilitating insertion and removal of the valve, its bottom wall 23 is formed with a peripheral radially extending flange 24, and the periphery of bottom wall 23, above flange 24 is threaded to permit it to be screwed into a correspondingly threaded cylindrical opening 25 in bottom wall 26 of lower cup 7. An outwardly extending downwardly facing peripheral shoulder 28 in opening 25 provides a seat for flange 24 when the valve is screwed into the opening in bottom cup 7, there being a sealing gasket 30 interposed between the opposing horizontal surfaces. To permit the use of a wrench in inserting and removing the valve, its lower wall 23 is provided with a downwardly extending hexagonal boss 31, which also forms the inlet opening 33 for a conduit 33a leading to a source of compressed air (not shown). To permit seating of lower cup 7 on the upper horizontal surface of truck frame lower chord 1 opening 32 is formed in the member to receive boss 31.

An annular gasket 34 is seated on the upper edges of walls 21 and 22 of valve device 19 and is held thereon by a disc 35 having a relatively deep central portion 36 of suitable diameter to be snugly received within the inner cylindrical cavity formed by wall 22, and an outwardly extending flange which overlies gasket 34, and forms with cylindrical walls 21 and 22, and horizontal bottom wall 23, an annular discharge chamber communicating by means of a passage 37 in bottom wall 23, and an aligned passage 38 in truck frame member 1, with the atmosphere. A damping effect can be provided by varying the diameter of outlet passage 37 so as to vary the rate of discharge of air from the spring in accordance with damping requirements. The discharge chamber formed between cylindrical walls 21 and 22 communicates with the interior of the spring chamber by means of inclined aligned passages 40 and 41 through cylindrical wall 22 and disc 35, respectively. Passage 40, 41 is inclined upwardly and radially inwardly so that its upper end intersects the upper surface of disc 35 very near the center of the disc. The deep central portion 36 of disc 35 forms the upper wall of an inlet chamber bounded by bottom wall 23 and inner cylindrical wall 22, and its upper surface, which forms a wall of the spring chamber. Communication between inlet chamber 22, 23, 36 and the expansible spring chamber is provided by inlet passage 43, which extends upwardly and radially outwardly from a point near the center of the lower surface of disc portion 36.

Disc 35 is formed with a central vertical cylindrical aperture 45, in which is slidably received an enlarged cylindrical collar element 46 of cylindrical pump actuating rod 47. Rod 47 extends upwardly through a cylindrical opening in a U-shaped guide member 49, which is secured by bolts 50 to the flange of disc 35 and through them to the outer wall 21 of valve body 20, bolts 50 serving also to retain disc 35 in engagement with the upper edges of walls 21 and 22. A spring 51 seated on the upper surface of member 49 and surrounding actuating shaft 47 engages a shoulder 52 on the shaft whereby to always urge the rod upwardly so that ball bearing 54, secured in a cavity in the upper end of the rod 47, is constantly in engagement with the lower surface of upper cup 17 whereby any vertical movements of the upper portion of cup 17 will cause a corresponding movement of actuating shaft 47. The ball bearing 54 is provided to accommodate transverse movements of bolster 4 and upper cup 17 relative to rod 47, lower cup 7, and truck frame elements 1, 2, 3.

The valve closure members consist of a pair of washers 56 and 57 concentric with rod 47 and positioned normally on the upper and lower surfaces of disc 35, the diameters of washers 56 and 57 being sufficient to cover the upper end of outlet passage 41 and the lower end of inlet passage 43 respectively. To assure a seal, flat annuli 59 of rubber are bonded to the surface of members 56 and 57 which face the upper and lower surfaces respectively of disc 35, the opening in the rubber annuli 59 being of sufficient diameter to permit metal-to-metal engagement between the upper and lower surfaces of collar 46 and washers 56 and 57. Operating rod 47 is provided with a pair of shoulders 61 and 62 spaced apart axially of the shaft at substantially equal distances from washers 56 and 57, and springs 63 and 64 seated on shoulders 61 and 62, urge washers 56 and 57 towards engagement with the upper and lower surfaces, respectively, of disc 35 whereby to close inlet passage 43 and outlet passage 41. When closure washers 56 and 57 are seated, the effect of springs 63 and 64 is supplemented between action of air pressure on the upper and lower surfaces of the closure members, thus affecting a pressure seal between the closure members and disc 35. Metal bellows 65 and 66 are also mounted on shaft 47 between shoulders 61 and 62 and washers 56 and 57, respectively, for preventing the passage of air between the washer openings and the rod. To facilitate application or removal of the upper closure washer 56, spring 63, and bellows 65, rod 47 is formed in two parts separable at the washer which forms shoulder 61, but normally secured together by mating threaded portions. The washer forming bottom shoulder 62 is similarly secured to the lower end of rod 47 by a bolt to facilitate removal or application of lower closure washer 57, spring 64, and bellows 66.

Operation of the valve is as follows: When the spring is at normal height, as shown in Figure 1, collar 46 is disposed substantially half way between the upper and lower washers 56 and 57 and during normal spring oscillations its movement in opening 45 is not sufficient to cause engagement with either upper washer 56 or lower washer 57. Upon application of an increased load to truck bolster 4, however, rod 47 will be urged downwardly, against the pressure of spring 51, as shown in Figure 2 causing the lower surface of collar 46 to engage the upper surface of washer 57, and thereby urging washer 57 downwardly against the pressure of spring 64 and opening inlet port 43; this will admit additional air to the spring chamber causing the spring chamber to be extended vertically. Spring 51 urges rod 47 upwardly until collar 46 reaches its normal position, at which time washer 57 will again engage the lower surface of disc 35, closing inlet port 43. As soon as the load is removed form bolster 4, bolster 4 and with it the upper cup 17 of spring 5 will move upwardly, as shown in Figure 3 causing rod 47, and with it collar 46, to move upwardly so that the upper surface of collar 46 engages the lower surface of upper washer 56, thereby uncovering the upper end of outlet passage 41 and permitting the discharge of air therethrough and through passage 40, and passages 37 and 38 to the atmosphere. As soon as spring 5 reaches its normal height, rod 47 and with it collar 46 will be urged downwardly until washer 56 again closes the upper end of outlet 41. Transverse and tilting movements of the upper cup 17 relative to actuating rod 47 are readily accommodated by the ball bearing engagement between these two members.

The details of the structure may be varied substantially without departing from the spirit of the invention, and the exclusive use of those modifications as come within the scope of the appended claims is contemplated.

What is claimed is:

1. In a vehicle spring device, an air chamber including a first wall-forming member and a second wall-forming member spaced apart from each other and movable toward and away from each other, a valve device carried within said air chamber by said first wall-forming member and including a valve member having spaced apart first and second surfaces, inlet and outlet passages originating respectively in said first and second surfaces and extending through said valve member and connecting said chamber, respectively, with a source of compressed air and with the atmosphere, a central aperture through said valve member, a rod extending through said aperture and having an enlarged shoulder-forming collar slidably received in said aperture, a first closure member normally urged against said first surface of said valve member and closing the inlet passage therethrough, and a second closure member normally urged against said second surface of said valve member and closing the outlet passage therethrough, said rod being movable with said second wall-forming member, said collar being engageable with said closure members responsive to movement of said wall-forming members toward and away from each other and unseating the closure member covering said inlet passage when the distance between said first and second wall-forming members is less than a predetermined amount and for uncovering said outlet passage when the distance between said wall-forming members exceeds a predetermined amount.

2. Structure according to claim 1 in which said wall-forming members are also movable transversely relative to each other.

3. Structure according to claim 2 in which one end of said rod includes an anti-friction bearing engaging the adjacent wall-forming member for accommodating such transverse movement.

4. Structure according to claim 1 in which said first wall-forming member includes an opening and said valve device includes structure normally closing said opening, said valve device being removable from said opening.

5. Structure according to claim 1 in which the thickness of said collar is less than the thickness of said valve member and said collar is normally disposed substantially intermediate the top and bottom surfaces of said valve member whereby only substantial movements of said wall-forming members toward and away from each other unseat said closure members.

6. In a vehicle spring device, an air chamber including an upper member and a lower member movable toward and away from each other, a valve body carried within said air chamber by one of said members, said body having a substantially horizontal wall portion including separate inlet and outlet chambers, inlet and outlet conduits connecting said inlet and outlet chambers respectively with a source of air under pressure and the atmosphere, an inlet passage through said horizontal wall portion and connecting said inlet chamber to said air chamber, an outlet passage through said horizontal wall portion and connecting said air chamber to said outlet chamber, a central opening in said horizontal wall portion, a rod extending through said opening and having an enlarged shoulder-forming collar slidably received in said opening, a pair of plates normally urged against opposite faces of said horizontal wall portion and closing, respectively, the inlet and outlet passages therethrough, said rod being movable with the opposite member from the member carrying said valve body, said collar being engageable with said plates responsive to movement of said members toward and away from each other for unseating the plate covering said inlet passage when the distance between said upper and lower members is less than a predetermined amount and for uncovering said outlet passage when the distance between said members exceeds a predetermined amount.

7. Structure according to claim 6 in which one of said wall-forming members is formed with an opening and said valve body is removably insertable in said opening, a portion of said valve body forming the closure of said opening.

8. Structure according to claim 7 in which said opening an a portion of the valve passing therethrough are co-operatingly threaded to permit said valve to be screwed into said opening.

9. Structure according to claim 6 in which said valve body is of cylindrical shape and said inlet chamber is centrally disposed thereof and is surrounded by said outlet chamber.

10. Structure according to claim 9 wherein said rod is co-axial with said valve body and said closure plates are annular discs.

11. Structure according to claim 10 wherein said inlet passage is inclined upwardly and radially outwardly from the lower surface of said horizontal wall portion and said outlet passage is inclined downwardly and radially outwardly from the upper surface of said horizontal wall portion, the intersections of said inlet and outlet passages respectively with the lower and upper surfaces of said horizontal wall portion being a less distance from the axis of said rod than the maximum radii of said annular discs.

12. Structure according to claim 10 in which said rod includes shoulder portions spaced apart from said closure plates, there being coil springs seated on said shoulder portions and normally urging said closure plates into seating engagement with said horizontal wall portions.

13. Structure according to claim 11 in which said valve body mounts an element having a portion spaced axially of said rod from said valve body, said rod passing through said portion and including a shoulder on the opposite side of said portion from said valve member and spaced from said portion, a coil spring seated on said portion and normally urging said rod toward the other wall-forming portion from that carrying said valve.

14. Structure according to claim 1 in which said closure members have a rubber-like facing on their surfaces adjacent said valve member.

15. Structure according to claim 12 in which bellows-like members enclose said coil springs and are in sealing engagement with said closure plates whereby to prevent the passage of air between said closure plates and said rod and through said central opening when said closure plates are seated against said valve member.

16. A valve device comprising a valve member having first and second oppositely facing surfaces, a first passage extending from said first surface through said valve member, a second passage extending from said second surface through said valve member from said first to said second surface, an aperture through said valve member, a rod extending through said aperture and having an enlarged collar portion slidably received within said aperture, a first closure member normally urged against said first surface of said valve member and closing said first passage, a second closure member normally urged against said second surface of said valve and closing said second passage, only a first end of each of said passages being in registry with a closure member, opposite surfaces of said collar portion being adapted to engage a portion of adjacent closure members when said rod is moved axially in said aperture for selectively unseating said closure members and opening said passages.

17. A valve device according to claim 16 in which said closure members comprise annular plates surrounding said rod, and said first and second passages intersect said first and second surfaces, respectively, inwardly of the outer periphery of said closure members and terminate outwardly of the outer periphery of said closure members.

18. A valve device according to claim 16 in which the thickness of said collar portion is less than the thickness of said valve member whereby substantial axial movement of said rod from its normal position is required to unseat either of said closure members.

References Cited in the file of this patent

UNITED STATES PATENTS

| | | |
|---|---|---|
| 1,679,762 | Bragg | Aug. 7, 1928 |
| 2,361,575 | Thompson | Oct. 31, 1944 |
| 2,708,451 | Rockwell | May 17, 1955 |